US012749613B2

(12) United States Patent
Yen et al.

(10) Patent No.: US 12,749,613 B2
(45) Date of Patent: Sep. 29, 2026

(54) INDUCTOR DEVICE

(71) Applicant: Realtek Semiconductor Corporation, Hsinchu (TW)

(72) Inventors: Hsiao-Tsung Yen, Hsinchu (TW); Hung-Han Chen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 889 days.

(21) Appl. No.: 18/056,246

(22) Filed: Nov. 16, 2022

(65) Prior Publication Data

US 2023/0154669 A1 May 18, 2023

(30) Foreign Application Priority Data

Nov. 17, 2021 (TW) ................................ 110142832

(51) Int. Cl.
*H01F 27/30* (2006.01)

(52) U.S. Cl.
CPC .................................. *H01F 27/303* (2013.01)

(58) Field of Classification Search
CPC ................... H01F 27/303; H01F 27/40; H01F 2017/0046; H01F 17/0006; H01F 2017/0073
USPC ..................................... 336/65, 83, 192, 200
See application file for complete search history.

(56) References Cited

U.S. PATENT DOCUMENTS 4,816,784 A * 3/1989 Rabjohn ............. H01F 27/2804 336/200
6,885,275 B1 * 4/2005 Chang ....................... H03L 7/23 336/200
7,164,339 B2 * 1/2007 Huang ................ H01F 17/0006 336/200
10,930,588 B2 2/2021 Raidl
11,095,324 B2 8/2021 Chen et al.
11,837,877 B2 12/2023 Pei et al.
2007/0268007 A1 11/2007 El Rai
2008/0284553 A1 11/2008 Lim et al.
2009/0096413 A1 4/2009 Partovi et al.
2012/0223796 A1 9/2012 Huang et al.
2012/0242406 A1 9/2012 Ke
(Continued)

FOREIGN PATENT DOCUMENTS

CN 102483984 A 5/2012
CN 104717833 A 6/2015
(Continued)

OTHER PUBLICATIONS

The office action of the related Chinese application No. 202010748865.1 issued on Nov. 23, 2023.
(Continued)

*Primary Examiner* — Tuyen T Nguyen
(74) *Attorney, Agent, or Firm* — CKC & Partners Co., LLC

(57) ABSTRACT

An inductor device includes a first trace, a second trace, and a capacitor. The first trace includes at least two sub-traces and a first crossing connection portion. One terminal of the at least two sub-traces is coupled to a first node. The first crossing connection portion is coupled between the at least two sub-traces of the first trace in an interlaced manner. The second trace includes at least two sub-traces. One terminal of the at least two sub-traces is coupled at a second node. The capacitor is coupled between the first node and the second node.

20 Claims, 6 Drawing Sheets

(56) References Cited

U.S. PATENT DOCUMENTS

| | | | |
|---|---|---|---|
| 2013/0265132 A1 | 10/2013 | Huang et al. | |
| 2013/0267185 A1 | 10/2013 | Chen et al. | |
| 2016/0268039 A1 | 9/2016 | Park et al. | |
| 2016/0285280 A1 | 9/2016 | Kallal et al. | |
| 2016/0336914 A1 | 11/2016 | Wang et al. | |
| 2018/0254139 A1 | 9/2018 | Yazaki | |
| 2018/0254313 A1 | 9/2018 | Huang et al. | |
| 2018/0294089 A1 | 10/2018 | Leong et al. | |
| 2020/0177151 A1 | 6/2020 | Pierce et al. | |
| 2021/0074465 A1* | 3/2021 | Yen | H01L 23/5227 |
| 2021/0074466 A1 | 3/2021 | Yen et al. | |
| 2022/0059277 A1 | 2/2022 | Yen et al. | |

FOREIGN PATENT DOCUMENTS

| | | | |
|---|---|---|---|
| CN | 108565102 | A | 9/2018 |
| CN | 110120293 | A | 8/2019 |
| CN | 110335737 | A | 10/2019 |
| CN | 111277264 | A | 6/2020 |
| CN | 112335042 | A | 2/2021 |
| CN | 112489921 | A | 3/2021 |
| CN | 112489922 | A | 3/2021 |
| CN | 112687456 | A | 4/2021 |
| TW | 200535878 | A | 11/2005 |
| TW | 201342402 | A | 10/2013 |

OTHER PUBLICATIONS

The office action of related CN application No. 202111192924.2 issued on Jul. 11, 2025 and its English summary.

The office action of the related Chinese application No. 202010825074.4 dated Dec. 30, 2021 and its English summary.

The office action of the corresponding Chinese application No. 202111412783.0 dated Jul. 15, 2025.

The office action of corresponding CN application No. 202111412783.0 issued on Jan. 30, 2026.

* cited by examiner

INDUCTOR DEVICE

RELATED APPLICATIONS

This application claims priority to and the benefit of Taiwan Application Serial Number 110142832, filed on Nov. 17, 2021, the entire contents of which are incorporated herein by reference as if fully set forth below in its entirety and for all applicable purposes.

BACKGROUND

Field of Invention

The present disclosure relates to an electronic device. More particularly, the present disclosure relates to an inductor device.

Description of Related Art

Radio frequency (RF) devices generate second harmonic, third harmonic, fourth harmonic, etc. during operation. The harmonics cause negative effect to other circuits. For example, second harmonic of 2.4 GHz circuit is near 5 GHz, and 5 GHz signal causes negative effect to system on chip (SoC).

Conventional way to solve negative effect caused by harmonics is that a filter will be disposed outside of a circuit for filtering the harmonics. However, the filter disposed outside of the circuit will affect function of the circuit and generate additional costs.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure is to provide an inductor device. The inductor device comprises a first trace, a second trace, and a capacitor. The first trace includes at least two sub-traces and a first crossing connection portion. One terminal of the at least two sub-traces is coupled to a first node. The first crossing connection portion is coupled between the at least two sub-traces of the first trace in an interlaced manner. The second trace comprises at least two sub-traces. One terminal of the at least two sub-traces is coupled at a second node. The capacitor is coupled between the first node and the second node.

Therefore, based on the technical content of the present disclosure, the capacitor of the inductor device brings a function to filter low frequency, such that low frequency signal induced at the inductor device cannot pass but high frequency signal can pass the capacitor directly. Low frequency signal is, for example, a signal that uses 2.4 GHz as main operating frequency. Therefore, the folded inductor will not affect the characteristic of the operating frequency of the inductor. If an inductor which is located at the center of the inductor device has a high frequency signal, for example, a second harmonic (i.e., 5 GHz signal), the high frequency signal may pass the capacitor and form an inductive inductor which is a circle flows through the folded inductor and the capacitor. Therefore, a 5 GHz harmonic signal corresponding to 2.4 GHz signal is induced in the inductor device of the present disclosure. The 5 GHz signal can be used in the circuit. For example, the 5 GHz signal can be amplified and then the amplified 5 GHz signal is used to cancel the 5 GHz harmonic signal of the operating frequency. In addition, the amplifying circuit can be arranged by a designer who is familiar with circuit design. As a result, a negative effect to a 5 GHz circuit can be reduced.

Besides, since the filter is disposed inside the inductor device of the present disclosure, there is no need to dispose a filter outside of the inductor device, so as to prevent an outer filter from affecting the circuit or prevent additional costs. In addition, the crossing structure of the present disclosure with symmetrical disposition can make the induced signals in the inner wire and the outer wire flow of the traces in an interlaced manner, such that the induced signals in the inner wire and the outer wire can be cancelled.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

According to the usual mode of operation, various features and elements in the figures have not been drawn to scale, which are drawn to the best way to present specific features and elements related to the disclosure. In addition, among the different figures, the same or similar element symbols refer to similar elements/components.

DESCRIPTION OF THE EMBODIMENTS

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms “a” and “an” include the plural reference unless the context clearly indicates otherwise.

Figure 1:
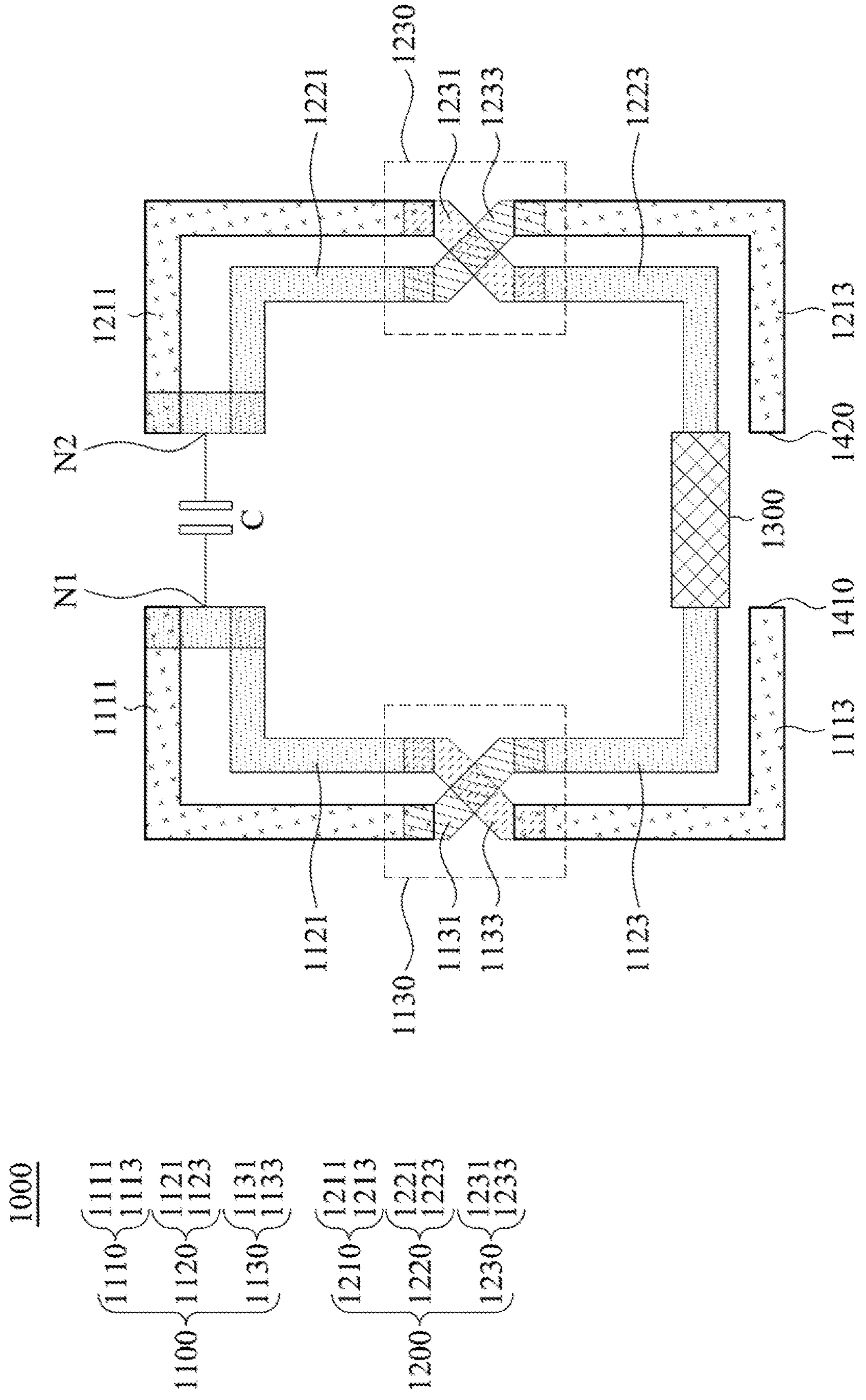
FIG. 1 depicts a schematic diagram of an inductor device according to one embodiment of the present disclosure.

FIG. 1 depicts a schematic diagram of an inductor device 1000 according to one embodiment of the present disclosure. As shown in the figure, the inductor device 1000 includes a first trace 1100, a second trace 1200, and a capacitor C. Besides, the first trace 1100 includes at least two sub-traces 1110, 1120 and a first crossing connection portion 1130. The second trace 1200 includes at least two sub-traces 1210, 1220.

With respect to structures, one terminal (e.g., the upper terminal) of the at least two sub-traces 1110, 1120 is coupled to a first node N1. The first crossing connection portion 1130 is coupled between at least two sub-traces 1110, 1120 of the first trace 1100 in an interlaced manner. In addition, one terminal (e.g., the upper terminal) of the at least two sub-traces 1210, 1220 is coupled to a second node N2. Besides, the capacitor C is coupled between the first node N1 and the second node N2.

In one embodiment, the second trace 1200 further includes a second crossing connection portion 1230. The second crossing connection portion 1230 is coupled between the at least two sub-traces 1210, 1220 of the second trace 1200 in an interlaced manner.

In one embodiment, the first trace 1100 includes a first sub-trace 1110 and a second sub-trace 1120. Besides, each of the first sub-trace 1110 and the second sub-trace 1120 includes a first terminal and a second terminal. As shown in the figure, the first terminal (e.g., the upper terminal) of the first sub-trace 1110 is coupled to the first node N1, and the first terminal (e.g., the upper terminal) of the second sub-trace 1120 and the first terminal (e.g., the upper terminal) of the first sub-trace 1110 are coupled to each other at the first node N1.

In one embodiment, each of the at least two sub-traces 1110, 1120 of the first trace 1100 includes a U-typed sub-trace. For example, the sub-traces 1110, 1120 are all U-typed sub-traces. In addition, each of the at least two sub-traces 1210, 1220 of the second trace 1200 includes a U-typed sub-trace. For example, the sub-traces 1210, 1220 are all U-typed sub-traces. However, the present disclosure is not limited to the structure as shown in FIG. 1. In some embodiments, the shape of the sub-trace can be other suitable shape depending on actual requirements.

In one embodiment, the first sub-trace 1110 includes a first half-trace 1111 and a second half-trace 1113. The first half-trace 1111 is coupled to the first node N1. In another embodiment, the second sub-trace 1120 includes a third half-trace 1121 and a fourth half-trace 1123. The first half-trace 1111 and the third half-trace 1121 are coupled to each other at the first node N1.

In one embodiment, the first crossing connection portion 1130 includes a first crossing connection element 1131 and a second crossing connection element 1133. The first crossing connection element 1131 is coupled to the first half-trace 1111 and the fourth half-trace 1123. In addition, the second crossing connection element 1133 is coupled to the second half-trace 1113 and the third half-trace 1121. As shown in the figure, the first crossing connection element 1131 and the second crossing connection element 1133 are coupled to each other in an interlaced manner.

In one embodiment, the second trace 1200 includes a third sub-trace 1210 and a fourth sub-trace 1220. Besides, each of the third sub-trace 1210 and the fourth sub-trace 1220 includes a first terminal and a second terminal. As shown in the figure, the first terminal (e.g., the upper terminal) of the third sub-trace 1210 is coupled to the second node N2, and the first terminal (e.g., the upper terminal) of the fourth sub-trace 1220 and the first terminal of the third sub-trace 1210 are coupled to each other at the second node N2.

In one embodiment, the third sub-trace 1210 includes a fifth half-trace 1211 and a sixth half-trace 1213. The fifth half-trace 1211 is coupled to the second node N2. In another embodiment, the fourth sub-trace 1220 includes a seventh half-trace 1221 and an eighth half-trace 1223. The fifth half-trace 1211 and the seventh half-trace 1221 are coupled to each other at the second node N2.

In one embodiment, the second crossing connection portion 1230 includes a third crossing connection element 1231 and a fourth crossing connection element 1233. The third crossing connection element 1231 is coupled to the fifth half-trace 1211 and the eighth half-trace 1223. In addition, the fourth crossing connection element 1233 is coupled to the sixth half-trace 1213 and the seventh half-trace 1221. As shown in the figure, the third crossing connection element 1231 and the fourth crossing connection element 1233 are coupled to each other in an interlaced manner.

In one embodiment, the inductor device 1000 further includes a connection element 1300, and the connection element 1300 is coupled between the fourth half-trace 1123 and the eighth half-trace 1223.

In one embodiment, the capacitor C and the connection element 1300 are located at two sides of the inductor device 1000 respectively. For example, the capacitor C is located at the upper side of the inductor device 1000, and the connection element 1300 is located at the lower side of the inductor device 1000.

In one embodiment, the first crossing connection portion 1130 and the second crossing connection portion 1230 are located at two sides of the inductor device 1000 respectively. For example, the first crossing connection portion 1130 is located at the left side of the inductor device 1000, and the second crossing connection portion 1230 is located at the right side of the inductor device 1000.

In one embodiment, the capacitor C and the connection element 1300 are disposed in a first direction, the first crossing connection portion 1130 and the second crossing connection portion 1230 are disposed in a second direction, and the first direction is perpendicular to the second direction. For example, the capacitor C and the connection element 1300 are disposed in a vertical direction as shown in the figure, and the first crossing connection portion 1130 and the second crossing connection portion 1230 are disposed in a horizontal direction as shown in the figure. Therefore, the two directions are perpendicular to each other.

In one embodiment, the inductor device 1000 further includes a first input/output terminal 1410 and a second input/output terminal 1420. The first input/output terminal 1410 is coupled to the second half-trace 1113. The second input/output terminal 1420 is coupled to the sixth half-trace 1213. However, the present disclosure is not limited to the structure as shown in FIG. 1, and it is merely an example for illustrating one of the implements of the present disclosure.

Figure 2:
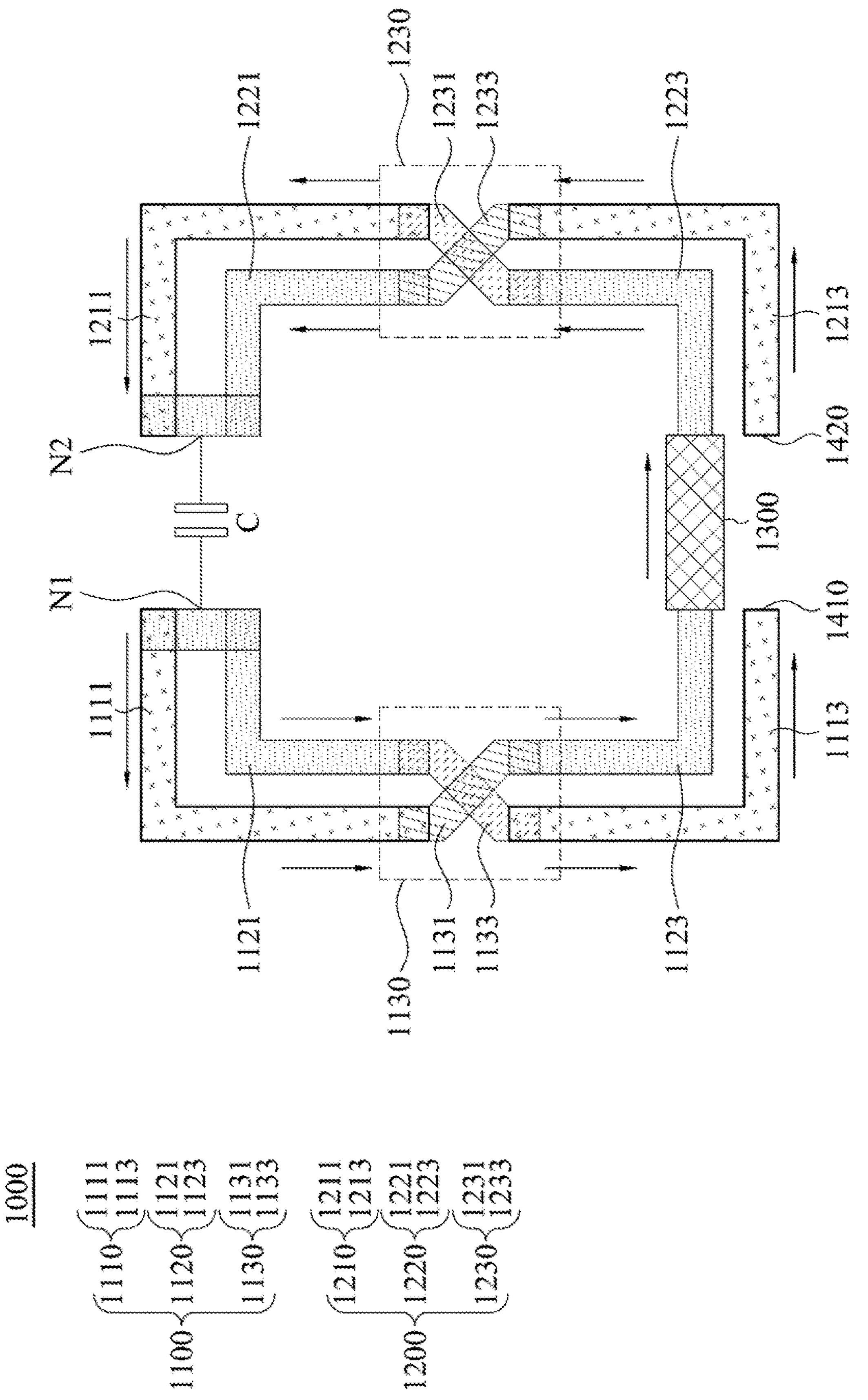
FIG. 2 depicts an application diagram of the inductor device shown in FIG. 1 according to one embodiment of the present disclosure.

FIG. 2 depicts an application diagram of the inductor device 1000 shown in FIG. 1 according to one embodiment of the present disclosure. As shown in the figure, when the induced signal flows through the first crossing connection portion 1130 and the second crossing connection portion 1230 which are symmetrical to each other, the induced signal flows from the inner wire to the outer wire of the first trace 1100 or the second trace 1200, or the induced signal flows from the outer wire to the inner wire of the first trace 1100 or the second trace 1200 so as to make the induced signals in the inner wire and the outer wire being more uniform, such that the induced signals in the inner wire and the outer wire can be cancelled. The inductor device 1000 of the present disclosure can improve third order intermodulation distortion (IMD3) about 2~3 dBs.

Figure 3:
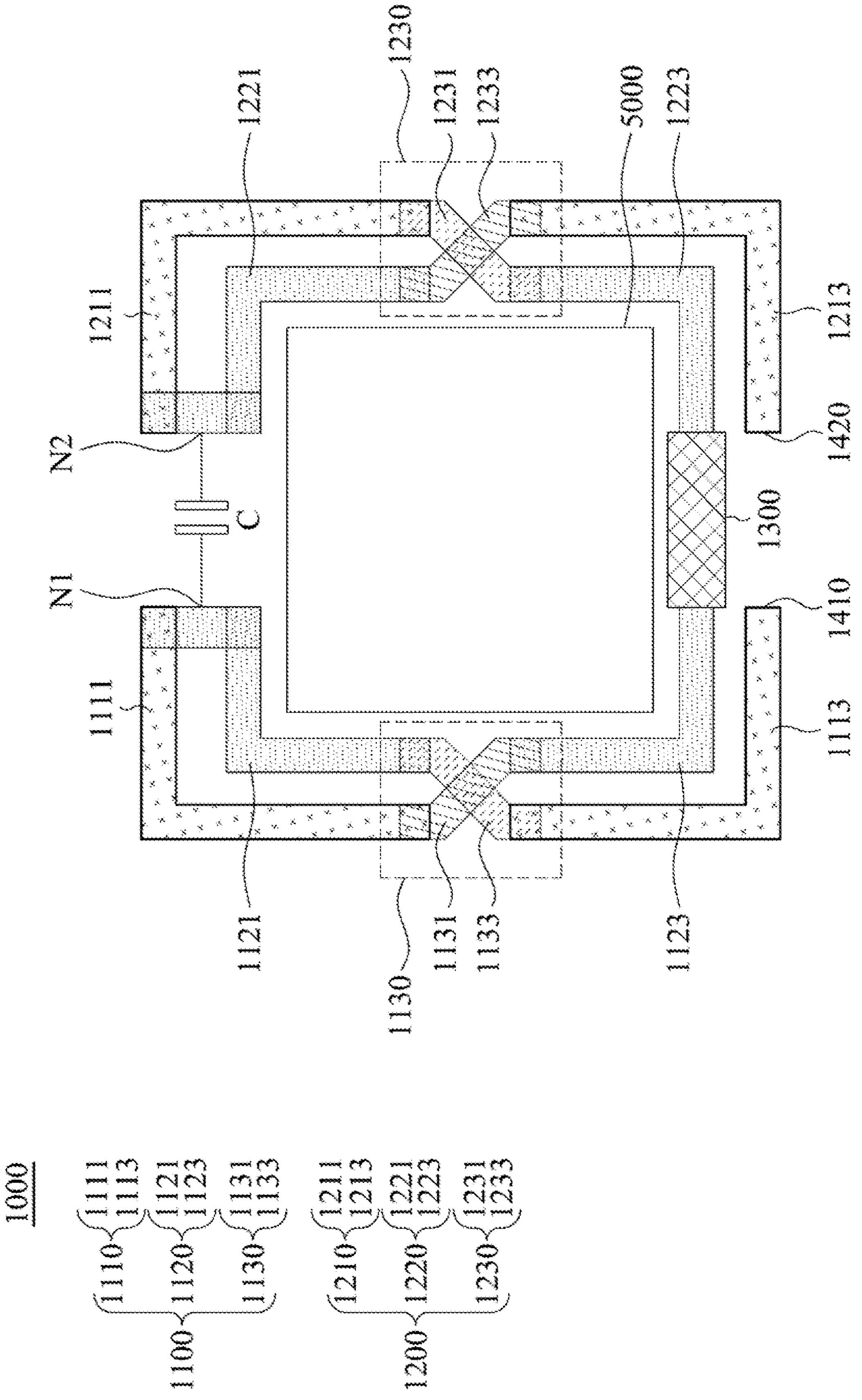
FIG. 3 depicts an operation diagram of the inductor device shown in FIG. 1 according to one embodiment of the present disclosure.

FIG. 3 depicts an operation diagram of the inductor device 1000 shown in FIG. 1 according to one embodiment of the present disclosure. As shown in the figure, an inductor 5000 can be disposed inside the inductor device 1000 in FIG. 3. It is noted that, the element in FIG. 2 and FIG. 3, whose symbol is similar to the symbol of the element in FIG. 1, has similar structure feature in connection with the element in FIG. 1. Therefore, a detail description regarding the structure feature of the element in FIG. 2 and FIG. 3 is omitted herein for the sake of brevity. Furthermore, the present disclosure is not limited to the structure as shown in FIG. 2 and FIG. 3, and the shape and the type of the inductor device which is disposed inside the inductor device 1000 can be other suitable shape and suitable type depending on accrual requirements. Moreover, the present disclosure is not limited to the structure as shown in FIG. 2 and FIG. 3, and it is merely an example for illustrating one of the implements of the present disclosure.

Figure 4:
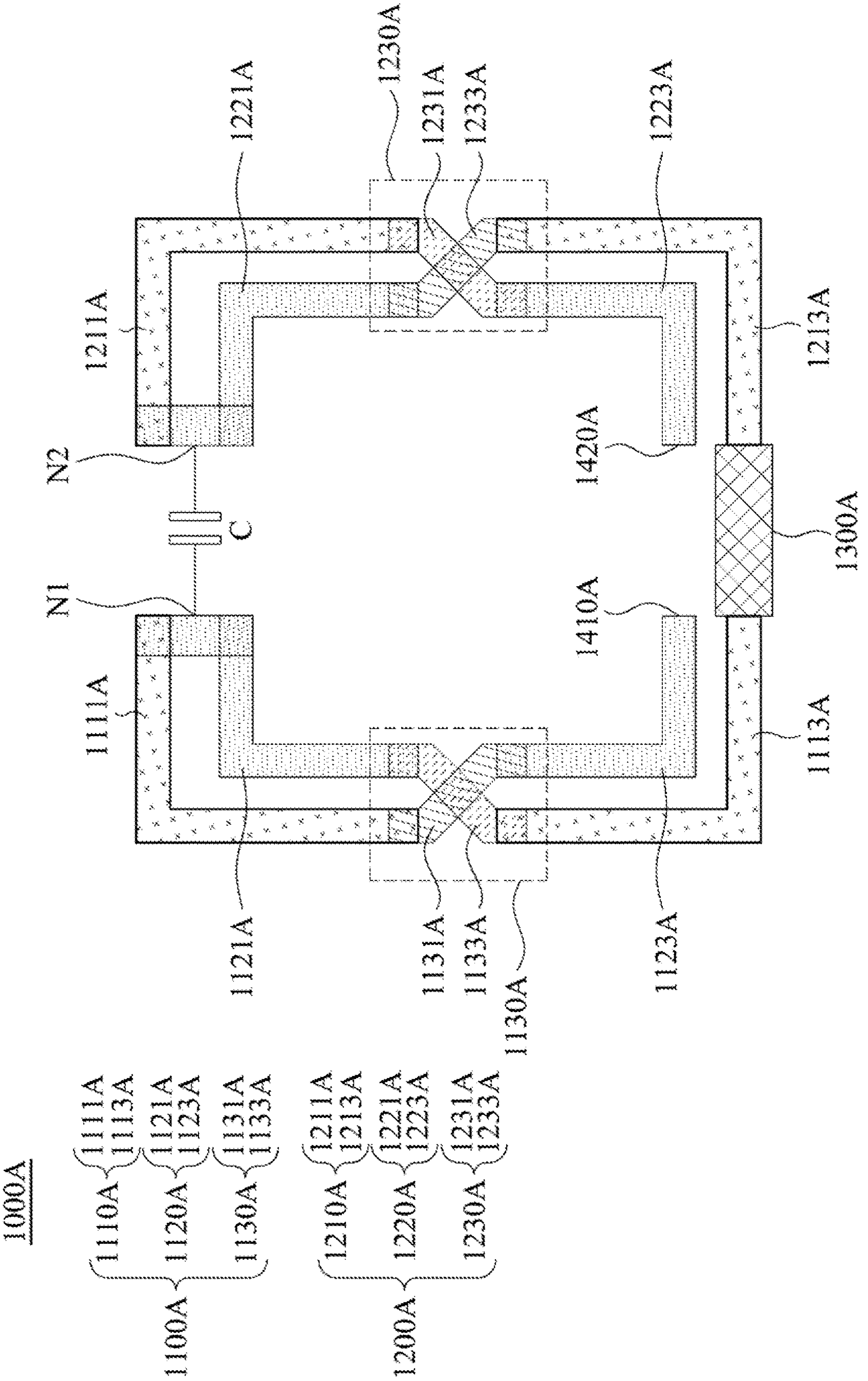
FIG. 4 depicts a schematic diagram of an inductor device according to one embodiment of the present disclosure.

FIG. 4 depicts a schematic diagram of an inductor device 1000A according to one embodiment of the present disclosure. Compared to the inductor device 1000 shown in FIG. 1, the difference in the inductor device 1000A in FIG. 4 is the disposition of the connection element 1300A, the first input/output terminal 1410A, and the second input/output terminal 1420A, which will be described in detail below.

As shown in the figure, the connection element 1300A of the inductor device 1000A in FIG. 4 is coupled between the second half-trace 1113A and the sixth half-trace 1213A. In one embodiment, the first input/output terminal 1410A is coupled to the fourth half-trace 1123A. The second input/output terminal 1420A is coupled to the eighth half-trace 1223A. It is noted that, the element in FIG. 4, whose symbol is similar to the symbol of the element in FIG. 1, has similar structure feature in connection with the element in FIG. 1. Therefore, a detail description regarding the structure feature of the element in FIG. 4 is omitted herein for the sake of brevity. Furthermore, the present disclosure is not limited to the structure as shown in FIG. 4, and it is merely an example for illustrating one of the implements of the present disclosure.

Figure 5:
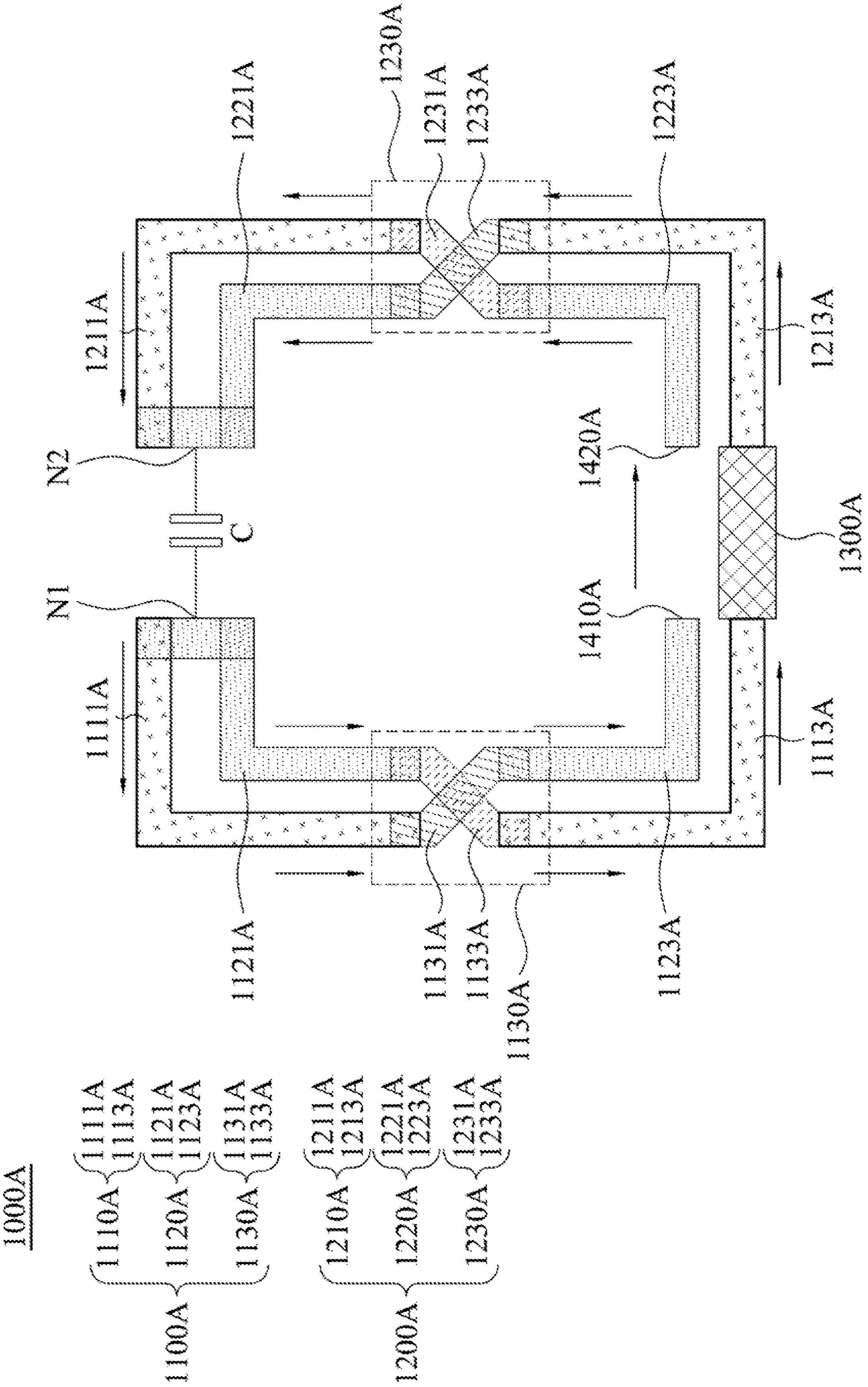
FIG. 5 depicts an operation diagram of the inductor device shown in FIG. 4 according to one embodiment of the present disclosure.

FIG. 5 depicts an operation diagram of the inductor device 1000A shown in FIG. 4 according to one embodiment of the present disclosure. As shown in the figure, when the induced signal flows through the first crossing connection portion 1130A and the second crossing connection portion 1230A which are symmetrical to each other, the induced signal flows from the inner wire to the outer wire of the first trace 1100A or the second trace 1200A, or the induced signal flows from the outer wire to the inner wire of the first trace 1100A or the second trace 1200A so as to make the induced signals in the inner wire and the outer wire being more uniform, such that the induced signals in the inner wire and the outer wire can be cancelled. The inductor device 1000A of the present disclosure can improve IMD3 about 2~3 dBs.

Figure 6:
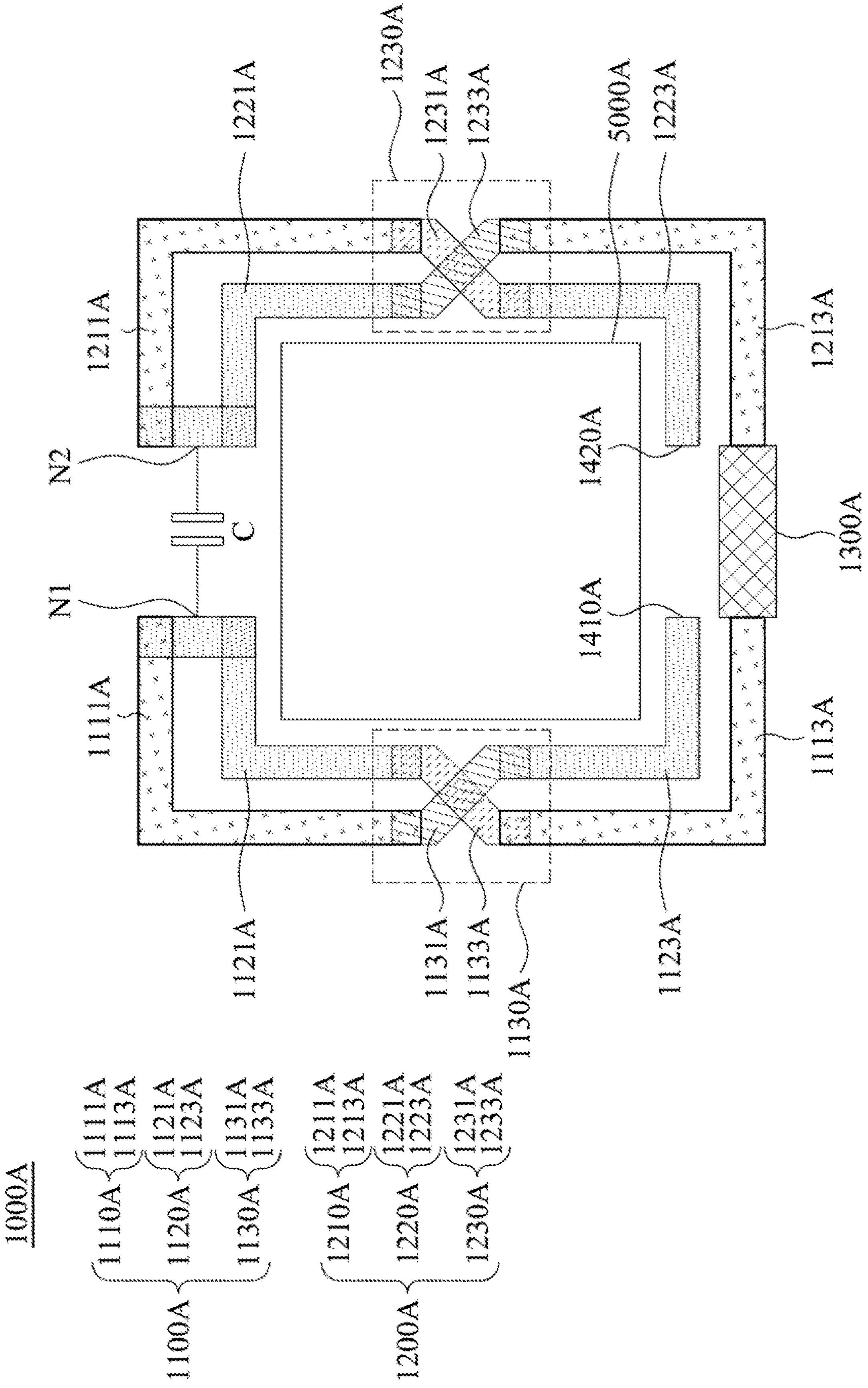
FIG. 6 depicts an application diagram of the inductor device shown in FIG. 4 according to one embodiment of the present disclosure.

FIG. 6 depicts an application diagram of the inductor device 1000A shown in FIG. 4 according to one embodiment of the present disclosure. As shown in the figure, an inductor 5000A can be disposed inside the inductor device 1000A in FIG. 6. It is noted that, the element in FIG. 5 and FIG. 6, whose symbol is similar to the symbol of the element in FIG. 4, has similar structure feature in connection with the element in FIG. 4. Therefore, a detail description regarding the structure feature of the element in FIG. 5 and FIG. 6 is omitted herein for the sake of brevity. Furthermore, the present disclosure is not limited to the structure as shown in FIG. 5 and FIG. 6, and the shape and the type of the inductor device which is disposed inside the inductor device 1000A can be other suitable shape and suitable type depending on accrual requirements. Moreover, the present disclosure is not limited to the structure as shown in FIG. 5 and FIG. 6, and it is merely an example for illustrating one of the implements of the present disclosure.

It can be understood from the embodiments of the present disclosure that application of the present disclosure has the following advantages. The inductor device of the present disclosure may induce high frequency signal (e.g., second harmonic) of inductor (e.g., 5000, 5000A) inside the inductor device. After the high frequency signal is amplified by additional circuit, the amplified high frequency signal is able to cancel negative effect to the circuit caused by second harmonic. For example, the capacitor of the inductor device is used to let high frequency signal pass and block low frequency signal. Therefore, the inductor device is able to deal with signals in high frequency or low frequency by two kinds of inducing manner.

Besides, since the filter is disposed inside integrated circuit (IC), for example, the inductor device, of the present disclosure, there is no need to dispose a filter outside of the inductor device, so as to prevent an outer filter from affecting the circuit or prevent additional costs. In addition, the crossing structure of the present disclosure with symmetrical disposition can make the induced signals in the inner wire and the outer wire flow in an interlaced manner, such that the induced signals in the inner wire and the outer wire can be cancelled. The inductor device of the present disclosure can improve IMD3 about 2~3 dBs.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An inductor device, comprising:

a first trace, comprising:

at least two sub-traces, wherein one terminal of the at least two sub-traces is coupled to a first node; and a first crossing connection portion, coupled between the at least two sub-traces of the first trace in an interlaced manner;

wherein the at least two sub-traces of the first trace and the first crossing connection portion are only located on one side of the inductor device;

a second trace, comprising:

at least two sub-traces, wherein one terminal of the at least two sub-traces is coupled to a second node; and a capacitor, coupled between the first node and the second node.

2. The inductor device of claim 1, wherein the second trace further comprises:

a second crossing connection portion, coupled between the at least two sub-traces of the second trace in an interlaced manner.

3. The inductor device of claim 2, wherein the at least two sub-traces of the first trace comprise:

a first sub-trace, comprising:

a first terminal, coupled to the first node; and a second terminal; and a second sub-trace, comprising:

a first terminal, coupled to the first terminal of the first sub-trace at the first node; and a second terminal.

4. The inductor device of claim 3, wherein the first sub-trace comprises:

a first half-trace, coupled to the first node; and a second half-trace.

5. The inductor device of claim 4, wherein the second sub-trace comprises:

a third half-trace, coupled to the first half-trace at the first node; and a fourth half-trace.

6. The inductor device of claim 5, wherein the first crossing connection portion comprises:

a first crossing connection element, coupled to the first half-trace and the fourth half-trace; and a second crossing connection element, coupled to the second half-trace and the third half-trace, wherein the first crossing connection element and the second crossing connection element are coupled to each other in an interlaced manner.

7. The inductor device of claim 6, wherein the at least two sub-traces of the second trace comprise:

a third sub-trace, comprising:

a first terminal, coupled to the second node; and a second terminal; and a fourth sub-trace, comprising:

a first terminal, coupled to the first terminal of the third sub-trace at the second node; and a second terminal.

8. The inductor device of claim 7, wherein the third sub-trace comprises:

a fifth half-trace, coupled to the second node; and a sixth half-trace.

9. The inductor device of claim 8, wherein the fourth sub-trace comprises:

a seventh half-trace, coupled to the fifth half-trace at the second node; and an eighth half-trace.

10. The inductor device of claim 9, wherein the second crossing connection portion comprises:

a third crossing connection element, coupled to the fifth half-trace and the eighth half-trace; and a fourth crossing connection element, coupled to the sixth half-trace and the seventh half-trace, wherein the third crossing connection element and the fourth crossing connection element are coupled to each other in an interlaced manner.

11. The inductor device of claim 10, further comprising:

a connection element, coupled between the fourth half-trace and the eighth half-trace.

12. The inductor device of claim 11, wherein the capacitor and the connection element are located at two sides of the inductor device respectively.

13. The inductor device of claim 12, wherein the first crossing connection portion and the second crossing connection portion are located at two sides of the inductor device respectively.

14. The inductor device of claim 13, wherein the capacitor and the connection element are disposed in a first direction, the first crossing connection portion and the second crossing connection portion are disposed in a second direction, and the first direction is perpendicular to the second direction.

15. The inductor device of claim 14, further comprising:

a first input/output terminal, coupled to the second half-trace; and a second input/output terminal, coupled to the sixth half-trace.

16. The inductor device of claim 10, further comprising:

a connection element, coupled between the second half-trace and the sixth half-trace.

17. The inductor device of claim 16, wherein the capacitor and the connection element are located at two sides of the inductor device respectively.

18. The inductor device of claim 17, wherein first crossing connection portion and the second crossing connection portion are located at two sides of the inductor device respectively.

19. The inductor device of claim 18, wherein the capacitor and the connection element are disposed in a first direction, the first crossing connection portion and the second crossing connection portion are disposed in a second direction, and the first direction is perpendicular to the second direction.

20. The inductor device of claim 19, further comprising:

a first input/output terminal, coupled to the fourth half-trace; and a second input/output terminal, coupled to the eighth half-trace.

* * * * *